United States Patent [19]

Cartigny et al.

[11] Patent Number: 5,678,721
[45] Date of Patent: Oct. 21, 1997

[54] DEVICE WITH JAWS FOR LOCKING/ UNLOCKING A LID ON A VESSEL

[75] Inventors: Michel Cartigny, Mirebeau; Eric Chameroy, Veronnes, both of France

[73] Assignee: SEB S.A., Ecully, France

[21] Appl. No.: 612,935

[22] PCT Filed: Jul. 5, 1995

[86] PCT No.: PCT/FR95/00896

§ 371 Date: Apr. 24, 1996

§ 102(e) Date: Apr. 24, 1996

[87] PCT Pub. No.: WO96/01069

PCT Pub. Date: Jan. 18, 1996

[30] Foreign Application Priority Data

Jul. 6, 1994 [FR] France ................... 94 08584

[51] Int. Cl.⁶ .................. A47J 27/08; A47J 27/09; B65D 45/00; B65D 45/34
[52] U.S. Cl. ................ 220/316; 99/337; 99/403; 220/203; 220/293
[58] Field of Search ............ 99/330, 337, 338, 99/342, 340, 403, 407; 220/203, 209, 293, 316, 319, 325, 912; 126/369, 377, 378, 373, 374, 388, 389

[56] References Cited

U.S. PATENT DOCUMENTS

| | | | |
|---|---|---|---|
| 2,549,387 | 4/1951 | Richeson | 220/316 |
| 4,024,982 | 5/1977 | Schultz | 220/293 |
| 4,135,640 | 1/1979 | MacQuilkin et al. | 220/316 |
| 4,161,260 | 7/1979 | Lagostina | 220/319 |
| 4,162,741 | 7/1979 | Walker et al. | 220/203 |
| 4,574,988 | 3/1986 | Karliner | 220/316 |
| 4,711,366 | 12/1987 | Chen | 99/337 |
| 4,733,795 | 3/1988 | Boehm | 220/316 |
| 4,796,776 | 1/1989 | Dalquist et al. | 220/203 |
| 4,932,550 | 6/1990 | Moucha | 99/403 |
| 5,048,400 | 9/1991 | Ueda et al. | 99/403 |
| 5,370,257 | 12/1994 | Chameroy et al. | 220/293 X |
| 5,370,259 | 12/1994 | Chameroy et al. | 220/316 |

FOREIGN PATENT DOCUMENTS

| | | |
|---|---|---|
| 0 139 772 | 10/1983 | European Pat. Off. . |
| 0491 324 A1 | 12/1991 | European Pat. Off. . |
| 33 27 439 A1 | 10/1985 | Germany . |
| PCT/EP91/ 01497 | 8/1991 | WIPO . |

Primary Examiner—Timothy F. Simone
Attorney, Agent, or Firm—Loeb & Loeb LLP

[57] ABSTRACT

A device for locking/unlocking a lid (1) on a vessel (2) to form a pressure cooking vessel. The device has at least two radially movable jaws (15a, 15b) on the lid (1), a portion (50) for controlling the movement of the jaws (15a, 15b), actuating members (20a, 20b) connected to each of the jaws (15a, 15b) and provided with at least one locking aperture (25a, 25b, 250), and at least one locking valve (10) mounted on the lid (1) and movable into a raised position in which it engages the aperture(s) (25a, 25b, 250) and locks the jaws (15a, 15b). The device is characterized in that it comprises a locking valve (10) combined with two actuating arms (20a, 20b) positionable one above the other at least when the jaws are in the locking position, the actuating arms having respective locking apertures (25a, 25b) arranged to be in register in the locking position.

24 Claims, 4 Drawing Sheets

DEVICE WITH JAWS FOR LOCKING/UNLOCKING A LID ON A VESSEL

TECHNICAL FIELD

The present invention relates to the general technical field of locking/unlocking devices for a cover of a container to form a cooking vessel, preferably of the pressure type.

The present invention concerns a locking/unlocking device for a cover of a cooking vessel, preferably under pressure, comprising at least two jaws mounted to be radially movable in opposition to one another on the cover between a locking position of the cover and an unlocking position as well as a means for controlling the movement of the jaws in a manner to cause them to assure one or the other of the fixed positions of locking or unlocking.

PRIOR ART

There is already known, according to patent application WO-92/03083 a pressure cooking vessel using a locking/unlocking device composed of jaws which are mounted for radial movement on the cover. The jaws, of which there are two, are diametrically opposite one another relative to the longitudinal axis of the vessel and are adapted such that when in their closing position they tightly grip the peripheral edge of the container in order to hermetically seal the vessel. Conversely, the jaws can occupy an unlocking position permitting opening of the vessel. Control of the displacement of the jaws is assured by a control means, which is a button mounted to move axially on the cover in a central position. The control means is provided with engagement surfaces which are specially shaped to act, during displacement of the control button, on inclined surfaces fixed to the jaws in order to displace them radially. Such a control system thus transforms, in a conventional manner, an axial movement into a radial displacement movement of the jaws between a closing position and an opening position.

It can be considered that such a device represents a positive contribution to systems for locking vessels in a closed position for pressure cooking, particularly because it does not require a relatively precise positioning such as indexing, between the cover and the container. On the other hand, such a system has been found to require a series of pieces which are movable relative to one another, and in particular radially, to assure control of disengagement of the jaws. The arrangements proposed imply combinations of complex movements, such as translations and rotations, provoking risks of significant jamming and leading to high fabrication costs and a less than optimum operating reliability.

It is equally in order to note that the control mechanism of the above-described device, as well as the relative displacements of the various parts, requires a relatively substantial physical effort on the part of the user.

Moreover, the prior art device does not comprise a system which permits assuring that the jaws are in a perfect locking position, or consequently of detecting that the vessel is correctly closed. It can in effect occur that for reasons of partial blockage or of defective displacement of the jaws or of the pieces assuring their movement, the jaws only assure a partial locking of the cover on the container. It being a matter of a vessel under pressure, detection of a complete and correct closing of the jaws is thus of a major importance for the safety of the user.

SUMMARY OF THE INVENTION

The object of the present invention is in consequence to provide a remedy to the various difficulties enumerated previously, and to provide a new locking/unlocking device for a pressure vessel permitting assurance in a simple and reliable manner of the good position of the jaws and of the complete and certain closing of the cover on the container.

Another object of the invention is to furnish a new locking/unlocking device in which the displacement of the jaws is particularly facilitated while being robust and simple.

Another object of the invention is to provide a new locking/unlocking device whose overall rigidity and assembly are improved.

Another object of the invention is to provide a novel locking/unlocking device in which the jaws are permanently brought into the locking position.

The objects assigned to the invention are achieved with the aid of a locking/unlocking device for a cover on a container in order to form a pressure cooking vessel comprising:

- at least two jaws mounted to be radially movable in opposition on the cover, between a locking position of the cover on the container and an unlocking position,
- a means for controlling movement of the jaws in a manner to cause them to assure one or the other of their locking or unlocking position,
- drive elements connected to each jaw, formed by drive arms fixed to at least each jaw, one of the arms being provided with a locking aperture,
- at least one locking valve mounted on the cover and adapted to occupy under the effect of the pressure existing in the vessel a raised position and a lowered position, the valve or valves and the aperture or apertures being disposed relatively so that in the locking position of the jaws, the valve or valves can engage the aperture or apertures in the raised position to lock the jaws in locking position characterized in that it comprises a locking valve associated with two drive arms, capable of being superimposed at least in the locking position of the jaws and each comprising a locking aperture disposed to coincide in the locking position.

BRIEF DESCRIPTION OF THE DRAWINGS

Other particularities and advantages of the invention will appear and become more readily apparent from a reading of the description presented here below, with reference to the attached drawings, given by way of illustrative and nonlimiting examples in which.

BEST MODE OF PRACTICING THE INVENTION

Figure 1:
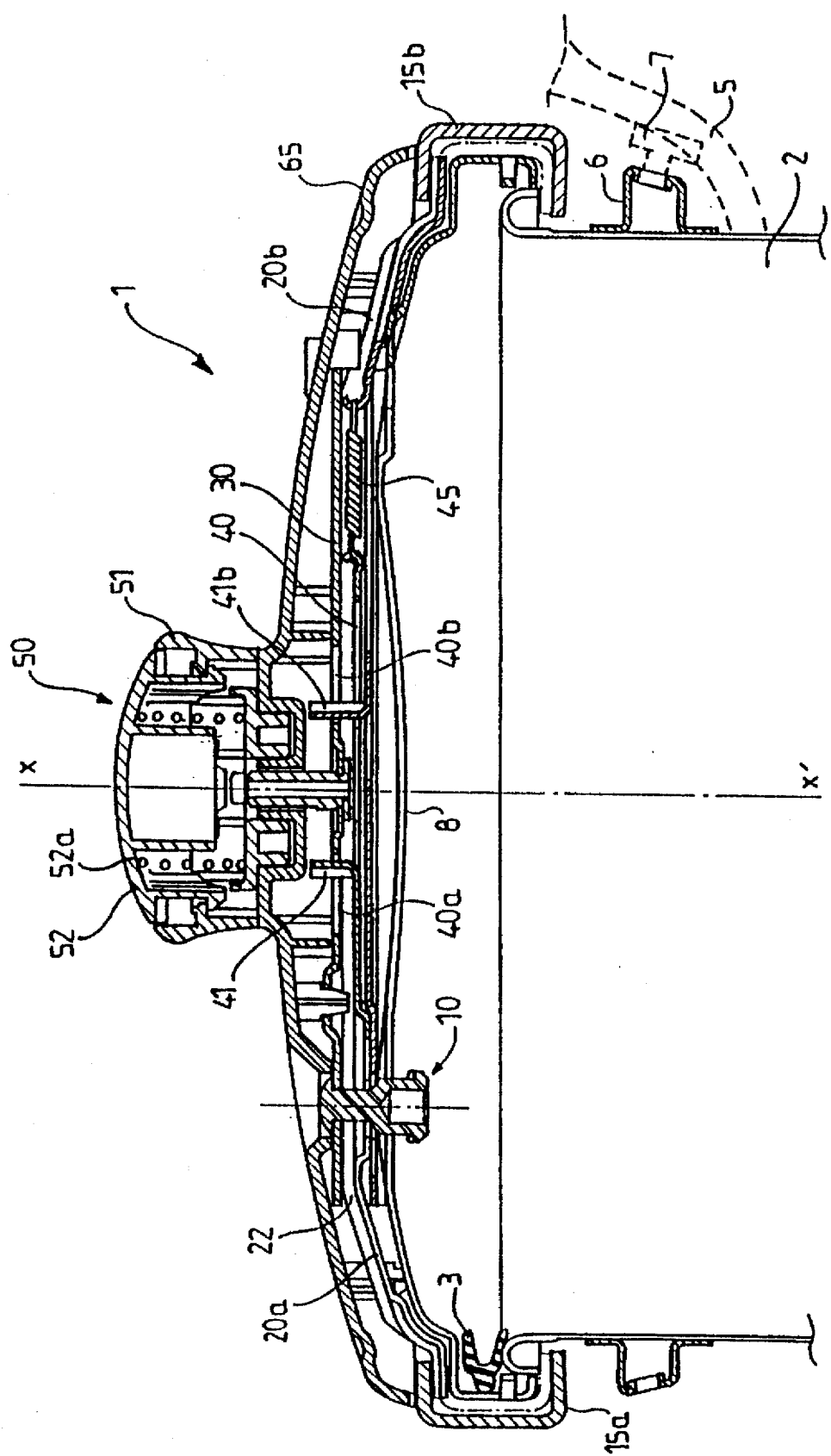
FIG. 1 shows, in a general transverse cross sectional view, the upper portion of a cooking vessel provided with a locking/unlocking device according to the invention.

The locking/unlocking device according to the invention is intended to assure closing by locking of a cover 1 on a container 2 in a manner to form a cooking vessel, preferably one for cooking under pressure such as a pressure cooker. The vessel is, for example, constituted by a container of substantially cylindrical form, with an axis of revolution x-x', on which cover 1 is intended to be connected in a sealed manner, for example by the intermediary of a lip-type seal 3. Container 2 is, in a conventional manner, made of a metallic material such as stainless steel and is provided with a thermally conductive bottom that is fixed to container 2, for example by hot stamping. The container 2 also includes gripping elements such as handles 5 fixed to the walls of container 2 by the intermediary of attachment feet 6 and screws 7.

Cover 1 includes a profiled closing disk 8 provided at its periphery with a zone in the form of a groove 9 serving as a reception seat for lip-type seal 3, and assuming therewith the fluid tightness of the closing of cover 1.

Figure 4:
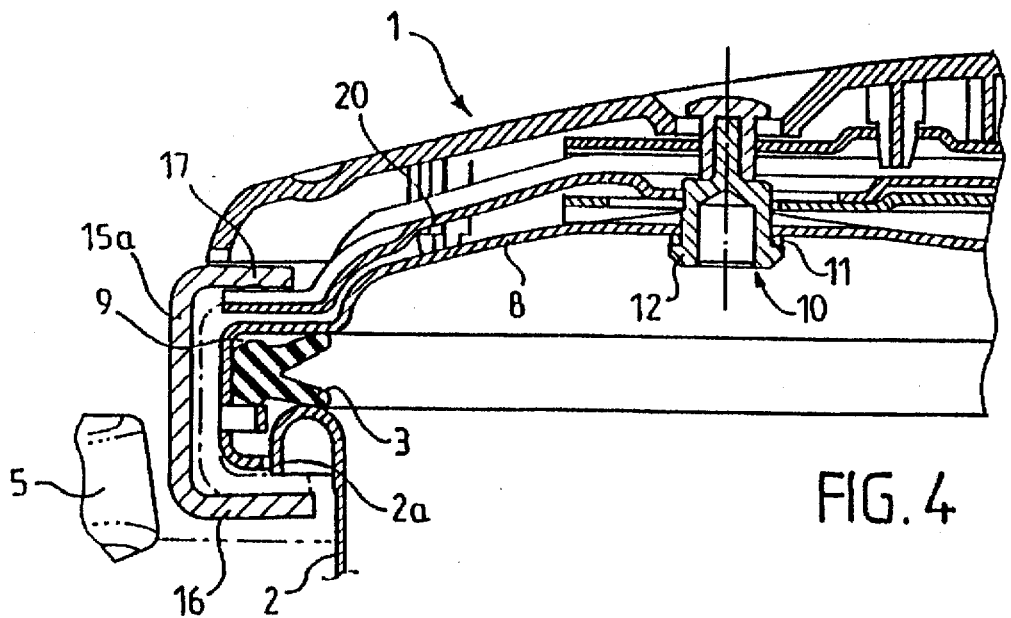
FIG. 4 shows, in a partial enlarged cross sectional view, a construction detail of the locking/unlocking device according to the invention in the locking position.
Figure 5:
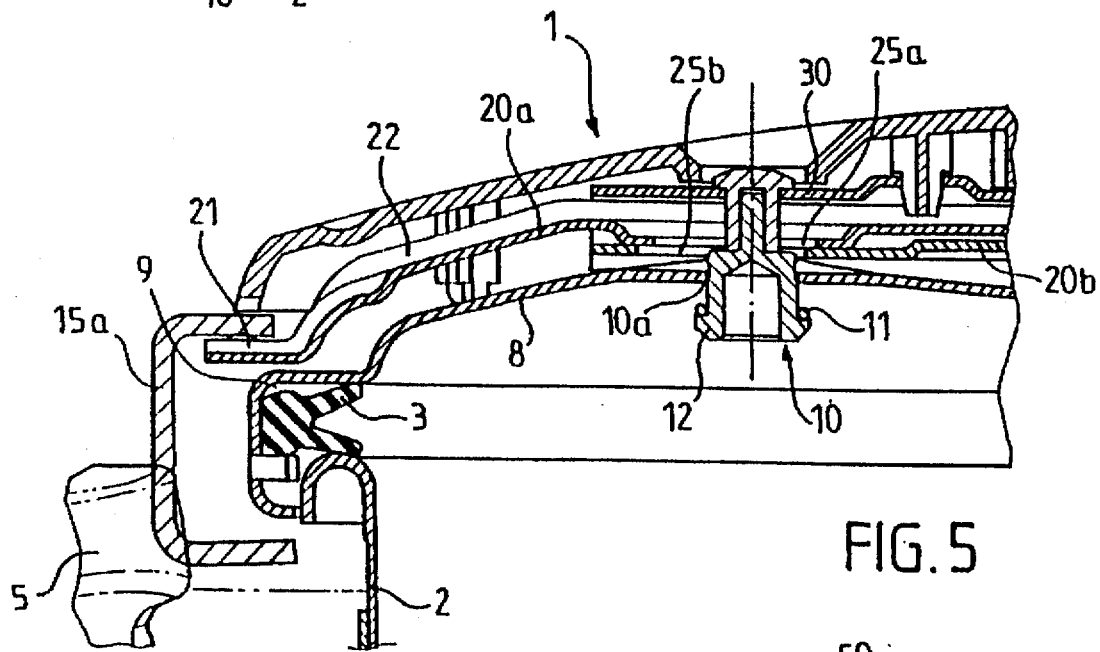
FIG. 5 shows, in a view analogous to that of FIG. 4, a partial cross sectional view of the locking/unlocking device according to the invention in the unlocking position.

Closing disk 8 is provided with at least one opening 10a permitting the passage and assembly of a locking valve 10 mounted for free axial sliding in said opening between a lower abutment position (such as shown in FIG. 5 for example), and an upper abutment position (such as shown in FIG. 4). Locking valve 10 can be constituted in a manner well known in the prior art of a safety finger whose principal purpose is to furnish a visual indication of the pressure existing in the vessel under pressure. Advantageously, the steam tightness, between the locking valve 10 and the opening 10a is improved by the interposition of a seal 11, this latter being maintained in position by resting on a flange 12 forming the lower radially exterior part of the locking valve 10.

Figure 2:
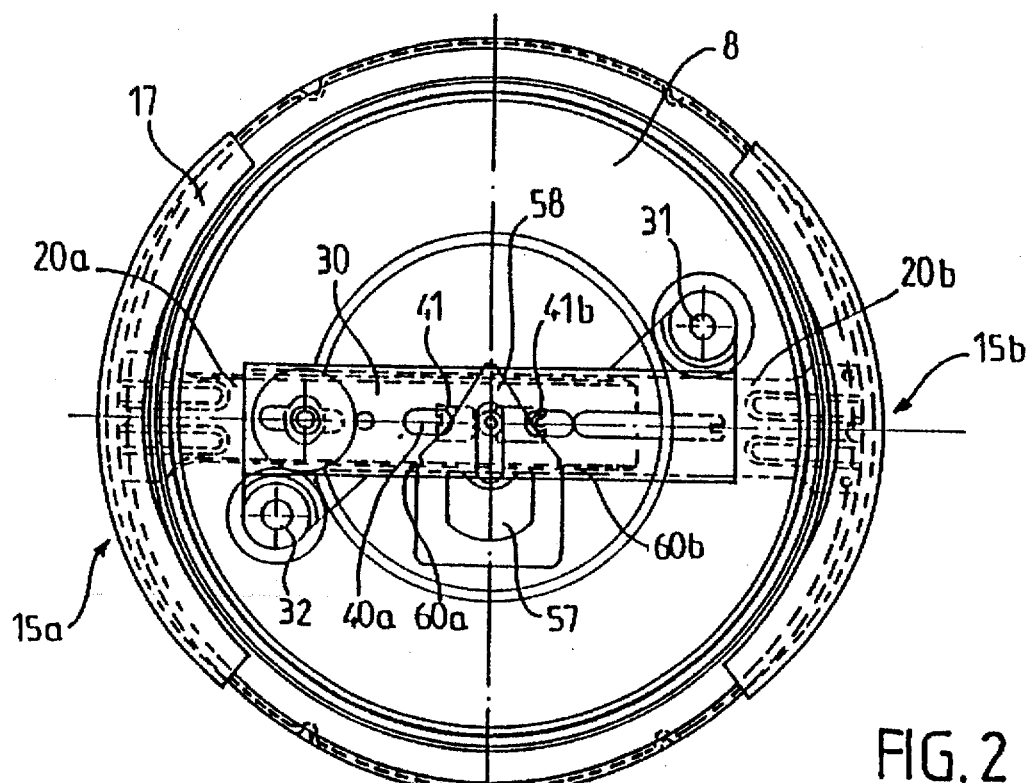
FIG. 2 shows, in a top plan view, a cooking vessel provided with the locking/unlocking device according to the invention, in which the jaws are in the locking position.
Figure 3:
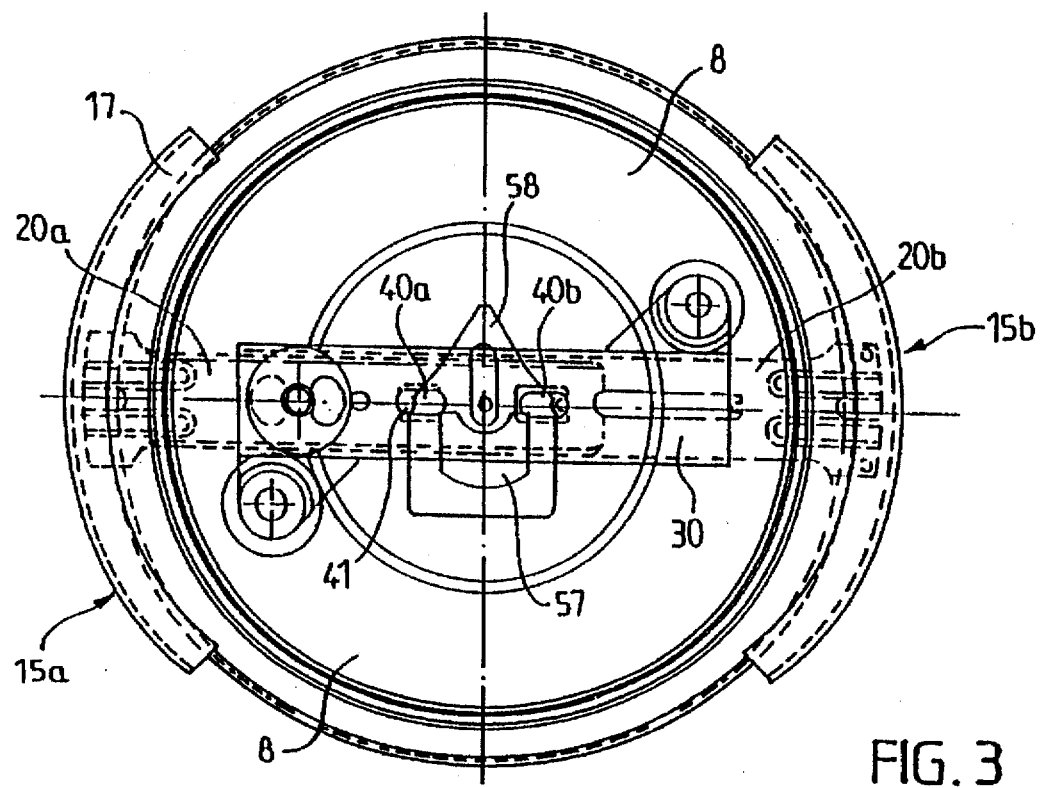
FIG. 3 shows, in a top view identical to that of FIG. 2, the jaws of the locking/unlocking device according to the invention in the unlocking position.

Cover 1 also includes at least two jaws 15a, 15b, mounted radially movably on the closing disk 8 between a locking position of the cover 1 on the container 2 (FIGS. 2 and 4) and an unlocking position (FIGS. 3 and 5). Jaws 15a, 15b have, in a conventional manner, U-shaped cross sections in the form of segments adapted to the shape of the vessel, and in the embodiment illustrated in the drawings, in the form of circular arcs having a selected length. Each jaw 15 includes a lower edge 16 and an upper edge 17, permitting each jaw to grip, respectively, the peripheral edge 2a of container 2 and the upper limit of groove 9. Each jaw 15a, 15b is movably mounted on the cover by the intermediary of drive elements including associated drive arms 20a, 20b, diametrically opposite and fixed by an extremity 21, for example by soldering or welding, to the upper edge 17. In the preferred embodiment of the invention shown in FIGS. 1–5, each drive arm 20a, 20b has the form of a profiled metal piece, which may be generally straight or flat, having a shape adapted to that of closing disk 8 and a transverse cross section in the form of a U which opens toward the exterior of the vessel and whose sides 22 also extend toward the exterior of the vessel.

According to a preferred embodiment of the invention, drive arms 20a, 20b have a length sufficient to be able to overlap, at least in part, during their radial displacement. Drive arms 20a, 20b are in particular capable of overlapping at least in the locking position of the jaws. According to this embodiment, drive arms 20a, 20b are advantageously self guided radially by one another, arm 20a forming the male arm and 20b forming the female arm, the male arm sliding in the female arm. Relative guiding of arms 20a, 20b is obtained by cooperation and friction of sides 22 of each of arms 20a, 20b. Such an arrangement obviously permits a reduction in the risks of possible deformation during radial sliding of each of the arms 20a, 20b, and allows a perfect mastery of linear displacement of each jaw 15a, 15b.

According to this preferred embodiment of the invention, each drive arm 20a, 20b is provided with a locking aperture 25a, 25b extending across the central part of each arm. The location of each locking aperture 25a, 25b is determined as a function of the length of each arm 20a, 20b such that apertures 25a, 25b would be in an alignment position when each jaws 15a, 15b are in locking position. Simultaneously, the position of apertures 25a, 25b, as well as the position of opening 10a and thus also valve 10, is selected so that when jaws 15a, 15b are in the locking position, apertures 25a, 25b as well as opening 10a are aligned. This arrangement permits locking valve 10 to occupy the predetermined position corresponding to the pressure existing within the vessel, and in particular to occupy its upper abutment position (FIG. 4) in which valve 10 engages in each locking aperture 25a, 25b to lock the jaws in their locking position. Such a position is obviously only achieved when jaws 15a, 15b occupy their locking position precisely, because only then can valve 10 move simultaneously through apertures 25a, 25b. In the case where the alignment of apertures 25a, 25b is not achieved during an attempted operation, valve 10 can not be displaced upwardly, with the result that there will be a sufficient escape of steam out of the vessel to prevent any pressure rise within the vessel.

Advantageously, guiding of linear and radial movement of drive arms 20a, 20b is assured by supplemental guide means which are fixed to cover 1.

According to a preferred embodiment of the invention, the guide means are formed by a support piece 30 which embraces arms 20a, 20b along the major part of their length.

According to a preferred embodiment of the invention, support piece 30 is formed from a plate having a transverse cross section in the form of a U, embracing and covering drive arms 20a, 20b, the U being oriented to face closing disk 8. Support plate 30 is advantageously fixed to closing disk 8 by the intermediary of two anchoring points 31 and 32, situated at opposite sides of the longitudinal axis of support plate 30. Anchoring points 31, 32 can be constituted by suitable fixing means, such as screws, or can also serve as the location for the passage of pressure regulation means. By way of a modification, it is equally possible to mount support plate 30 in a reversed manner, the internal face of support plate 30 being turned toward the exterior of the vessel, the arms 20a, 20b sliding in one another as well as in the support plate. In this position, support plate 30 embraces and supports arms 20a, 20b.

According to another variant of the invention, the guide means can be constituted by ramps or equivalent means, fixed to or integral with closing disk 8.

In all cases, and in particular in the case where a support plate 30, presenting a U-shaped profiled, is utilized, the guide means assume, in addition to a function of supplementary aid to the linear sliding of the arms 20a, 20b, a complementary function of rigidifying the mechanical assembly, assuring radial displacement of jaws 15a, 15b.

The path of displacement of drive arms 20a, 20b, between each of their limit positions, corresponding to the opening and closing position of jaws 15a, 15b, is limited by the intermediary of a slot 40, preferably arranged in male arm 20a, in which can be displaced a lug 41 fixed to the female arm 20b. The path of displacement of arms 20a, 20b is thus limited by the establishment of abutment positions of lug 41 against one or the other of the two extremities of slot 40. According to a particular embodiment, support plate 30 comprises an opening aligned with apertures 25a, 25b, as well as with opening 10a, permitting the assembly in suspension of locking valve 10 (FIG. 5), by its upper part of reduced cross section relative to the lower part of the locking valve 10. Such an arrangement permits relative sliding of drive arms 20a, 20b when valve 10 is in its lower position, which simultaneously assures free movement of jaws 15a, 15b.

Advantageously, drive arms 20a, 20b are brought permanently in the locking position by an elastic return means constituted for example by a tension spring 45 interposed between two hooks which are respectively fixed to each of drive arms 20a, 20b.

The locking/unlocking device according to the invention also comprises a control means 50 for the movement of jaws 15a, 15b, permitting each jaw to be brought into one or the other of their fixed locking/unlocking position.

Figure 6:
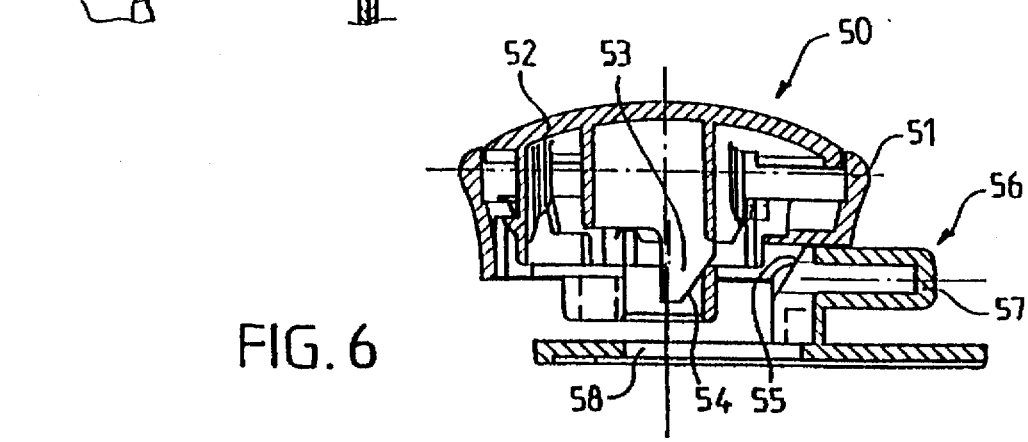
FIG. 6 shows, in a partial cross sectional view, a detail of the control means of the device according to the invention.

According to a preferred embodiment of the invention such as shown in FIGS. 4 and 6, control means 50 has the form of an element for gripping cover 1 and is constituted by a control element 56 mounted for movement in a substantially radial direction on cover 1 and coupled kinematically with a control button 52 mounted on cover 1 to be movable in a substantially axial direction.

Control means 50 is constituted by a knob 51 which is fixed to cover 1, and by control button 52 mounted to be axially and elastically movable by a return spring 52a in knob 52. Return spring 52a maintains control button 52 in the upper position shown in FIGS. 4 and 6. Control button 52 comprises at its lower part an activation finger 53 provided with an inclined engagement surface 54 intended to come to engage, during depression of control button 52, a complementary engagement surface 55 arranged on control element 56. Control element 56 is mounted on cover 1 according to a predetermined path in a manner to be brought, during its displacement between two limits defining its path, to engage drive arms 20a, 20b in a manner to control their radial displacement.

According to a preferred embodiment of the invention, control element 56 assures radial displacement of drive arms 20a, 20b in an active manner in the radial external direction, i.e. in a direction corresponding to the progressive spreading apart of jaws 15a, 15b, to attain their extreme unlocking position. According to this preferred embodiment of the invention, control element 56 is coupled kinematically with control button 52 whose displacement in the substantially axial direction defined previously controls the displacement of drive arms 20a, 20b in the radially inward direction, i.e. in a direction of displacement of the jaws in the direction of their locking position. For this purpose, control element 56 is formed by a button mounted on knob 51. Button 56 presents a control zone 57 which is raised and manually accessible to the user, as well as a flat activating triangular zone 58 arranged to engage with activating means fixed to drive arms 20a, 20b. According to a preferred embodiment of the invention, the activating means are constituted by the lug 41 and by a corresponding lug 41b which is fixed to drive arm 20b. Displacement of the triangular zone 58 in a radial direction, in either sense thus permits displacement equally radially of lugs 41, 41b but in a direction which is oriented at 90° with respect to the direction of displacement of button 56. By the expedient of the triangular zone 58, button 56 consequently engages in an active manner drive arms 20a, 20b to progressively assure their spreading apart when the user presses on the control zone 57. When the guide means are formed by a support plate 30 covering drive arms 20a, 20b, the support plate 30 comprises two openings 40a, 40b, arranged in the central part of said plate, and intended for the passage, respectively, of lugs 41, 41b, to permit their radial displacement. Openings 40a, 40b have for their secondary function to limit the individual displacement path of each arm 20a, 20b by serving as an abutment for lugs 41, 41b, thus preventing disengagement of jaws 15a, 15b outside of cover 1.

Advantageously, triangular activating zone 58 comprises two recesses 60a, 60b, for example semicircular and in any case of a form complementary to that of lugs 41, 41b, in a manner to determine a stable and fixed opening position for the jaws corresponding to a blockage in position of said lugs in the corresponding recesses 60.

During depression of control button 52, the activating finger 53, when the jaws 15a, 15b are in the unlocking position, comes to engage the complementary engaging surface 55 in order to control the release of button 56. The release corresponds to movement of lugs 41, 41b out of recesses 60a, 60b, activating finger 53 thus forming release means while recesses 60 form blocking means.

According to the preferred embodiment of the invention shown in FIGS. 1 to 4, control element 56 and control button 52 are mounted on the cover in a central position in order to form a lifting assembly for the cover.

By way of a variation, it is of course possible to separate the lifting assembly of the cover from the control element 56 and the control button 52.

By way of a complementary modification, it is obviously also possible, without departing from the framework of the invention, to provide a control device comprising a single control element 56 capable of assuring, by itself, control in the two senses of radial displacement of the drive arms 20a, 20b . According to this modification, control element 56 assures displacement of drive arms 20a, 20b in an active manner in the radially external direction and in the radially internal direction defined previously. Control element 56 is then constituted by a simple push button whose shape permits the user by a simple pushing or pulling to assure spreading or moving together of jaws 15a, 15b.

Cover 1 can include a trim plate 65 covering the totality of the mechanism, said plate being placed in a sandwich between support plate 30 and knob 51.

The functioning of the locking of the locking/unlocking device according to the invention is the following.

Placement of cover 1 on container 2 requires opening of jaws 15a, 15b and radial activation of button 56 which permits a sliding movement of triangular activating zone 58 which comes to progressively engage by its flanks the lugs 41, 41b (FIG. 2). The progressive displacement of button 56 permits progressive moving apart of the drive elements and in particular the drive arms 20a, 20b, and simultaneously the jaws 15a, 15b . The translation of button 56 in a radial direction thus permits the translation of the two jaws 15a, 15b . The end of the translation is determined by the positioning of each lug 41, 41b in the associated recesses 60a, 60b (FIG. 3). Beyond this translation, the limit position of jaws 15a, 15b is equally determined by the abutment position of lug 41 against the extremity of slot 40. In the position thus attained, the jaws 15a, 15b are in a stable unlocking position and thus permit a centering of cover 1 on the edge of container 2 (FIG. 5).

Closing of the receptacle, i.e. the attainment by jaws 15a, 15b of their locking position, is obtained by pressure of the palm of the hand on the button of knob 52 which is consequently activated axially. Its downward movement in the knob 51 provokes the engagement of engagement surface 54 against its complementary surface 55 arranged on push button 56, which is progressively pushed back in a radially external direction. During the course of this translation in the inverse sense, lugs 41, 41b are first of all freed from recesses 60a, 60b, the jaws 15a, 15b then being progressively pulled toward one another toward their locking position (FIGS. 2 and 4). The return toward this locking position is obtained by the return action of spring 45 permitting the positioning of each jaw 15a, 15b between the cover 1 and under the edge 2a of the container 2.

The vessel thus being closed in a sealed manner, pressure can thereafter increase and provoke the passage of locking valve 10 into its upper position through apertures 25a, 25b, which in the complete closing position of jaws 15a, 15b, are coaxial. The engagement of locking valve 10 through apertures 25a, 25b (FIG. 4) permits locking in position of each of the drive arms 20a, 20b, and simultaneously each corresponding jaw.

The locking/unlocking device according to the invention thus permits to assure an increase in pressure in complete safety since passage of the locking valve into the apertures 25a, 25b can only occur if the drive arms 20a, 20b, and thus the jaws 15a, 15b are in perfect locking position. The locking valve 10 opposes, moreover, any radial displacement of jaws 15a, 15b . The radial and linear displacement of the drive arms 20a, 20b, is moreover obtained without risk of deformation due to the presence of a succession of guide means formed by the sliding of the interior arms in one another and by the support plate 30.

As an example of a complementary variation, it is obviously possible to resort to drive arms 20a, 20b which are not mounted relatively one with respect to the other in an overlapping position, the locking being obtained with the aid of a locking valve 10 associated with each of the drive arms 20a, 20b.

Figure 7:
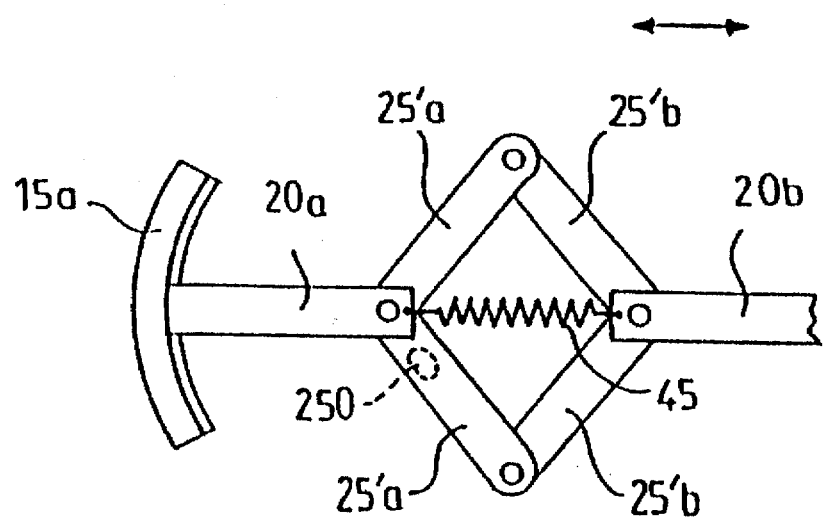
FIGS. 7 and 8 show alternative embodiments of the invention.

According to another embodiment (FIG. 7), the drive elements are formed by each actuating member (drive arm) 20a, 20b which is extended at the opposed end of the jaw 15a, 15b by two links 25'a, 25'b mounted movably in rotation on the associated arm by a same axis. The pairs of links 25'a, 25'b are articulated between one another in order to form a deformable parallelogram, connected to the control means 50. The jaws 15a, 15b are pulled toward one another in an elastic manner by a spring 45. The retraction or extension of the parallelogram controls the radial displacement of jaws 15a, 15b . According to this embodiment, it is possible to provide only a single locking valve 10 associated with a single locking aperture 250, formed on a drive element for example on one of the drive arms 20a, 20b, and/or equally in one of the links of each pair 25'a, 25'b. Each link can nevertheless comprise a locking aperture 250 and be associated with a locking valve 10. As in the other embodiments, the locking apertures 250 can also be arranged in the central part of each arm 20a, 20b, which can also be superposed at least in part in the locking position.

Figure 8:
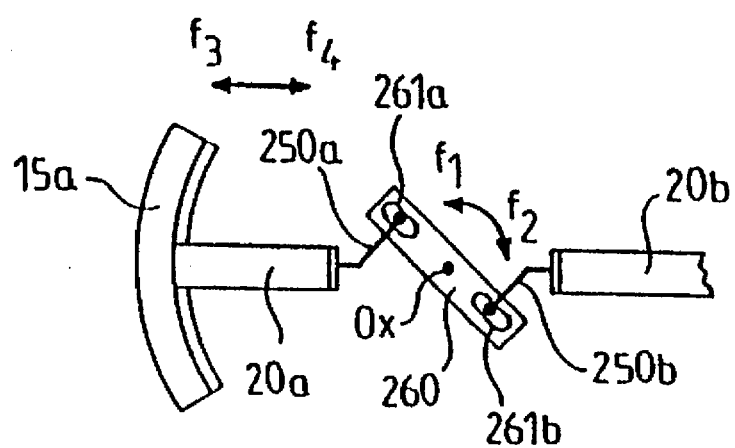

According to another embodiment, shown in FIG. 8, the drive elements are formed by drive arms 20a, 20b, connected by the intermediary of activating bars 250a, 250b for example bent, to a central common bar 260, mounted to be movable in rotation on the cover, preferably along the axis of rotation Ox of the receptacle. The central bar 260 is connected to the control means 50, in a fashion to be able to be rotated in the direction of arrows f1, f2, around the axis Ox in order to control the radial displacement f3, f4 of the drive arms 20a, 20b. To this end the activating bars 250a, 250b which extend each associated drive arm 20a, 20b, slide in respective apertures 261a, 261b, forming sliders arranged in each extremity of the central bar 260. According to this embodiment, the drive arms 20a, 20b ar equally susceptible to be superposed at least in part in the locking position.

POSSIBILITIES OF INDUSTRIAL APPLICATION

The invention finds its industrial application in the fabrication of vessels for cooking under pressure, in particular pressure cookers.

We claim:

1. Locking/unlocking device for a cover (1) on a container (2) to form a pressure cooking vessel comprising:

at least two jaws (15a, 15b) radially movably mounted in opposition on the cover (1), between a locking position of the cover (1) on the container (2) and an unlocking position, a means for control (50) of the movement of the jaws (15a, 15b) in a manner to cause them to assure one or the other of their locking or unlocking position, drive elements (20a, 20b) connected to each jaw (15a, 15b), formed by drive arms fixed to each jaw (15a, 15b) at least, one of the arms (20a, 20b) being provided with a locking aperture (25a, 25b, 250), at least one locking valve (10) mounted on the cover (1) and adapted to occupy under the effect of pressure existing in the vessel, an upper position and a lower position, the valve or valves (10) and the aperture or apertures (25a, 25b, 250) being disposed relatively so that in the locking position of the jaws (15a, 15b), the valve or valves (10), can engage the aperture or apertures (25a, 25b, 250) in the upper position to lock the jaws (15a, 15b) in the locking position characterized in that it comprises one locking valve (10) associated with two drive arms (20a, 20b) capable of being superimposed at least in the locking position of the jaws and each comprising a locking aperture (25a, 25b) disposed to coincide in the locking position.

2. Device according to claim 1 characterized in that the drive arms (20a, 20b) are guided radially, for example self guided one in the other by sliding.

3. Device according to claim 1 characterized in that the drive arms (20a, 20b) are provided at each of their extremity with one pair of links (25'a, 25'b) movable and articulated between them to form a deformable parallelogram connected to the means for control (50).

4. Device according to claim 3 characterized in that it comprises a single locking aperture (250) arranged in one of the links.

5. Device according to claim 1 characterized in that the drive arms (20a, 20b) are connected together by a central bar (260), mounted to be movable in rotation on the cover (1), and connected to the means for control (50).

6. Device according to claim 5 characterized in that the central bar (260) is movable in rotation along the axis of revolution (Ox) of the vessel and is provided with two orifices (261a, 261b) forming slides in which slide the activation bars (250a, 250b) extending each of the drive arms (20a, 20b) when the central bar (260) is placed in rotation in order to control the radial displacement of the drive arms (20a, 20b).

7. Device according to claim 1 characterized in that it comprises means for guiding the radial movement of the drive arms (20a, 20b), said means being fixed to the cover (1).

8. Device according to claim 7 characterized in that the means for guiding are formed by a support piece (30) holding the drive arms (20a, 20b).

9. Device according to claim 8 characterized in that the support piece (30) covers the drive arms (20a, 20b).

10. Device according to claim 8 characterized in that the means for guiding are formed by a plate having a transverse section in the form of a U, holding and supporting the drive arms (20a, 20b).

11. Device according to claim 1 characterized in that the drive arms (20a, 20b) are formed of a female arm (20b) and a male arm (20a) which slides in the female arm, the relative path of the arms being limited by the intermediary of a slot (40) arranged in one arm, preferably in the male arm (20a), and in which can be displaced between two abutment positions, corresponding to the fixed positions of locking and unlocking, a lug (41) fixed to the other arm, preferably the female arm (20b).

12. Device according to claim 11 characterized in that the relative path of the drive arms is limited by two openings (40a, 40b) arranged in the support plate (30) and intended for the passage respectively of lug (41) and of a lug (41b) fixed to the female arm (20b).

13. Device according to claim 1 characterized in that the drive arms (20a, 20b) are brought permanently into the locking position by an elastic restoring means (45).

14. Device according to claim 13 characterized in that the elastic restoring means (45) is a spring interposed between each of the drive arms (20a, 20b).

15. Device according to claim 1 comprising a device for controlling the opening and the closing of the jaws (15a, 15b) characterized in that it comprises a control element (56) mounted for movement in a substantially radial direction on the cover (1) and along a determined path, said element (56) being led, during its displacement, to engage the drive arms (20a, 20b) in a fashion to control their radial displacement.

16. Device according to claim 15 characterized in that the control element (56) assures the displacement of the drive arms in an active manner in the radial external sense and in the radial internal sense.

17. Device according to claim 15 characterized in that the control element (56) assures the displacement of the drive arms in an active manner in the radial external sense, said control element (56) being coupled kinematically with a control button (52) mounted to be movable on the cover (1) in a substantially axial direction adapted to control the displacement of the drive arms (20a, 20b) in the radially internal sense.

18. Device according to claim 17 characterized in that the control element (56) comprises means for blocking (60) the drive arms (20a, 20b) in the unlocking position, the control button (52) comprising release means (53, 54) to control the disarming of the means for blocking (60).

19. Device according to claim 15 characterized in that the control element is a push button (56) adapted to be controlled manually.

20. Device according to claim 19 characterized in that the push button (56) actively engages the drive arms (20a, 20b) by the intermediary of a triangular zone (58) to assure the spreading of the drive arms (20a, 20b).

21. Device according to claim 20 characterized in that the means for blocking (60) are formed by recesses (60) arranged in the triangular zone (58) to cooperate with the lugs (41, 41b) fixed to the drive arms (20a, 20b).

22. Device according to claim 17 characterized in that the control button (52) is movable axially in an active manner by depression.

23. Device according to claim 18 characterized in that the release means (53, 54) comprise an activating finger (53) adapted to engage the push button (56) during axial depression of the control button (52).

24. Device according to claim 17 characterized in that control element (56) and the control button (52) are mounted on the cover (1) in a central position to form a holding assembly.

* * * * *